United States Patent [19]

Ackeret

[11] Patent Number: 4,607,894
[45] Date of Patent: Aug. 26, 1986

[54] DEVICE FOR STORING GRAMOPHONE AND VIDEO DISCS

[75] Inventor: Peter Ackeret, Kusnacht, Switzerland

[73] Assignee: IDN Inventions & Development of Novelties AG, Chur, Switzerland

[21] Appl. No.: 645,071

[22] Filed: Aug. 28, 1984

[30] Foreign Application Priority Data

Aug. 29, 1983 [EP] European Pat. Off. ......... 83108479.3

[51] Int. Cl.⁴ ............................................ A47B 88/04
[52] U.S. Cl. ...................................... 312/15; 312/12; 312/18
[58] Field of Search ....................... 312/15, 10, 11, 12, 312/13, 14, 16, 17, 18, 19, 191; 206/387, 15, 309

[56] References Cited

U.S. PATENT DOCUMENTS

| 1,432,559 | 10/1922 | Jamieson | 312/16 |
| 1,590,148 | 6/1926 | Bergdal | 312/10 |
| 2,182,460 | 12/1939 | Werner | 312/12 |
| 2,760,839 | 8/1956 | Martin | 312/10 |
| 3,836,222 | 9/1974 | Kuntze | 312/10 X |

Primary Examiner—William E. Lyddane
Assistant Examiner—José V. Chen

[57] ABSTRACT

A storage system for disc-shaped record media comprises a housing in which a plurality of disc holders are slidably mounted. A spring-biased slider member, that may be locked in the housing, is coupled to the holders and causes the holders to be conveyed staggered stepwise out of the housing in such a manner that the discs may be grasped at a segment that is exposed. The holders have a dished profile which supports the discs only in their edge region where there are no recording tracks.

20 Claims, 13 Drawing Figures

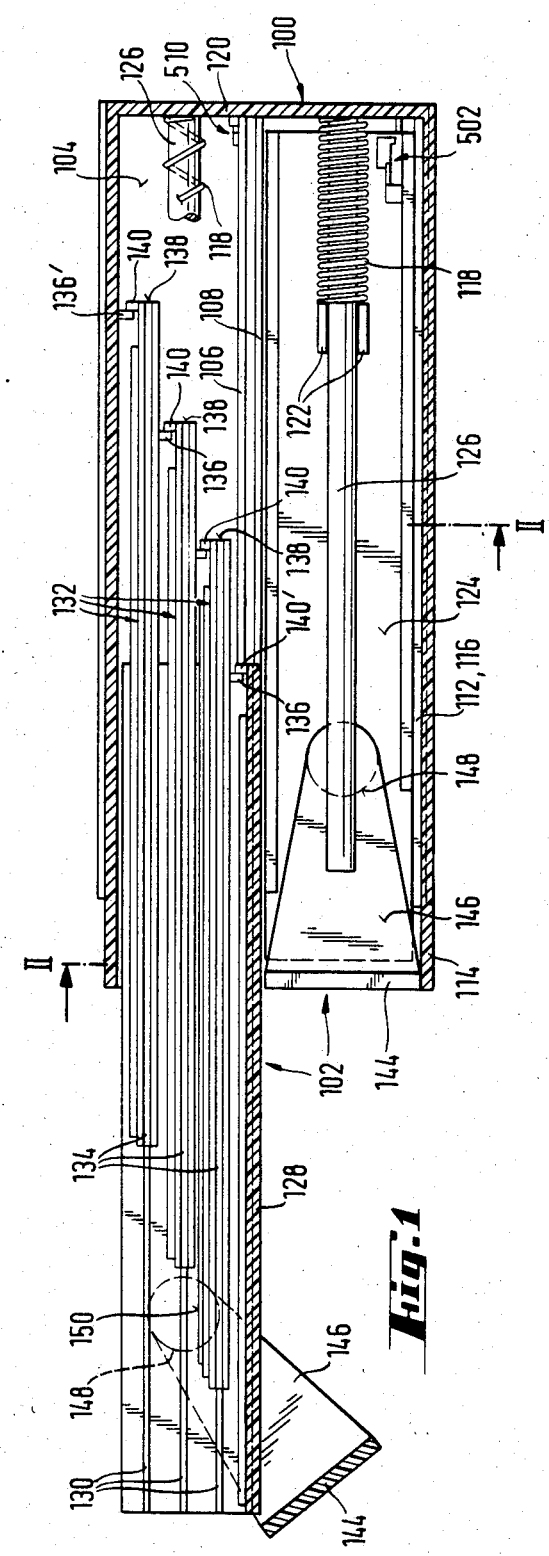
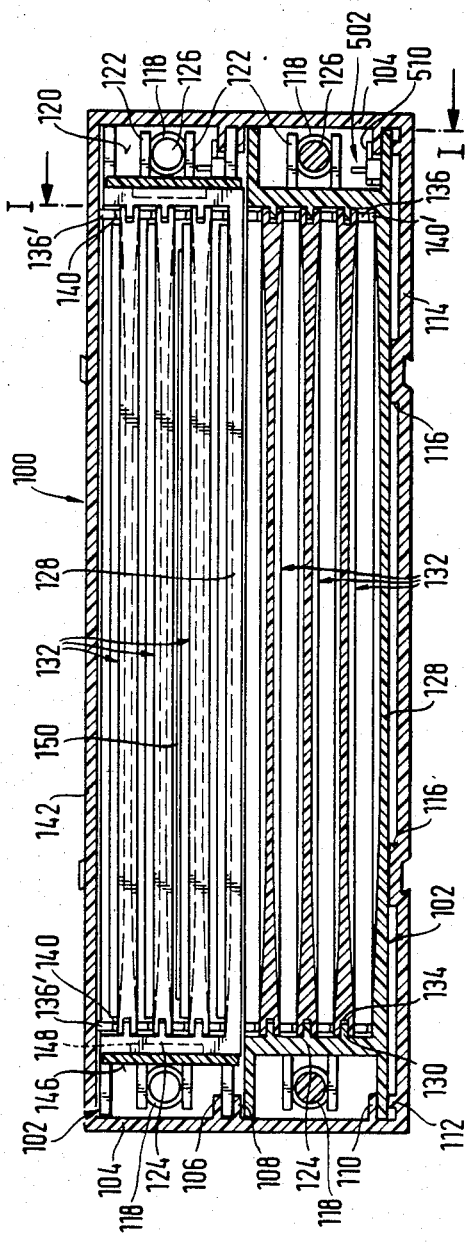

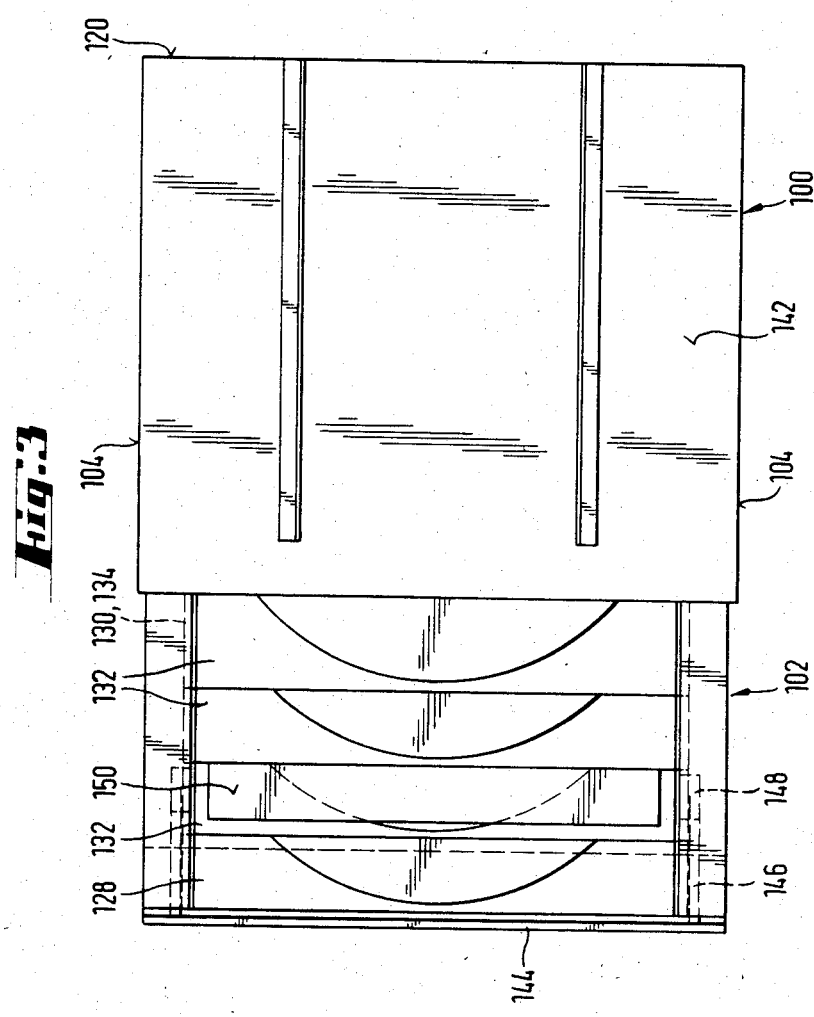
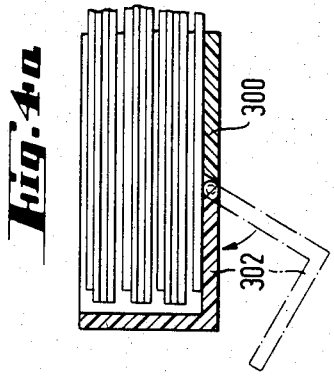
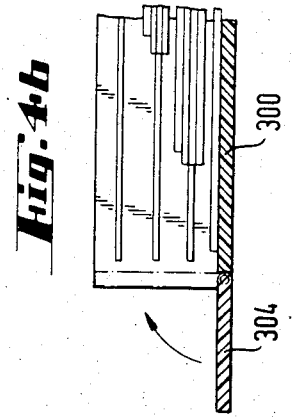

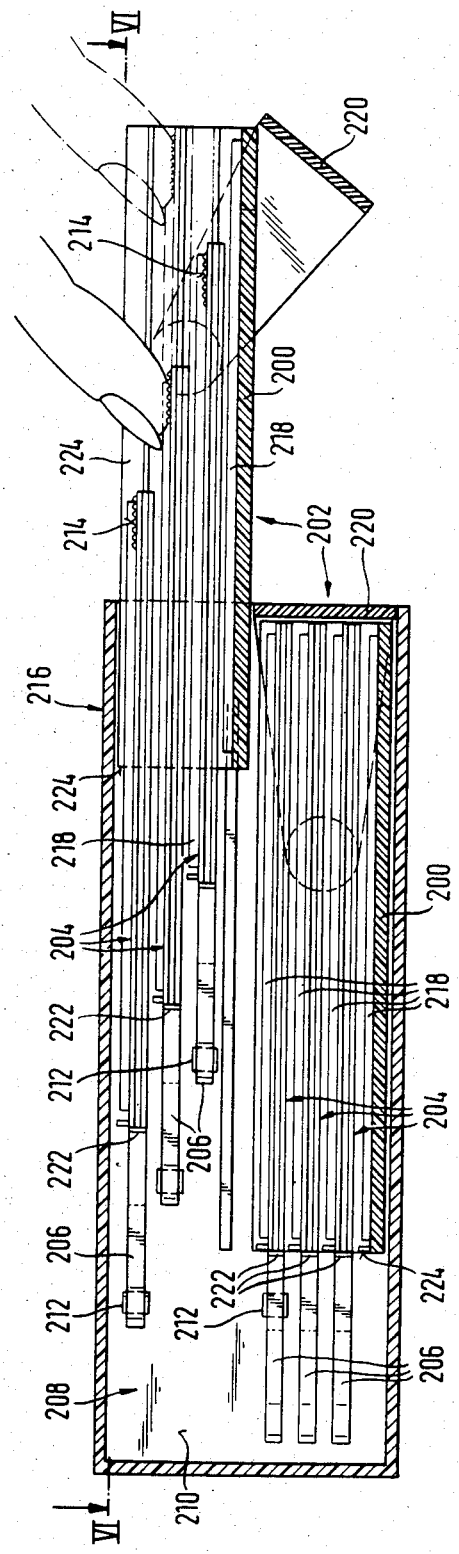

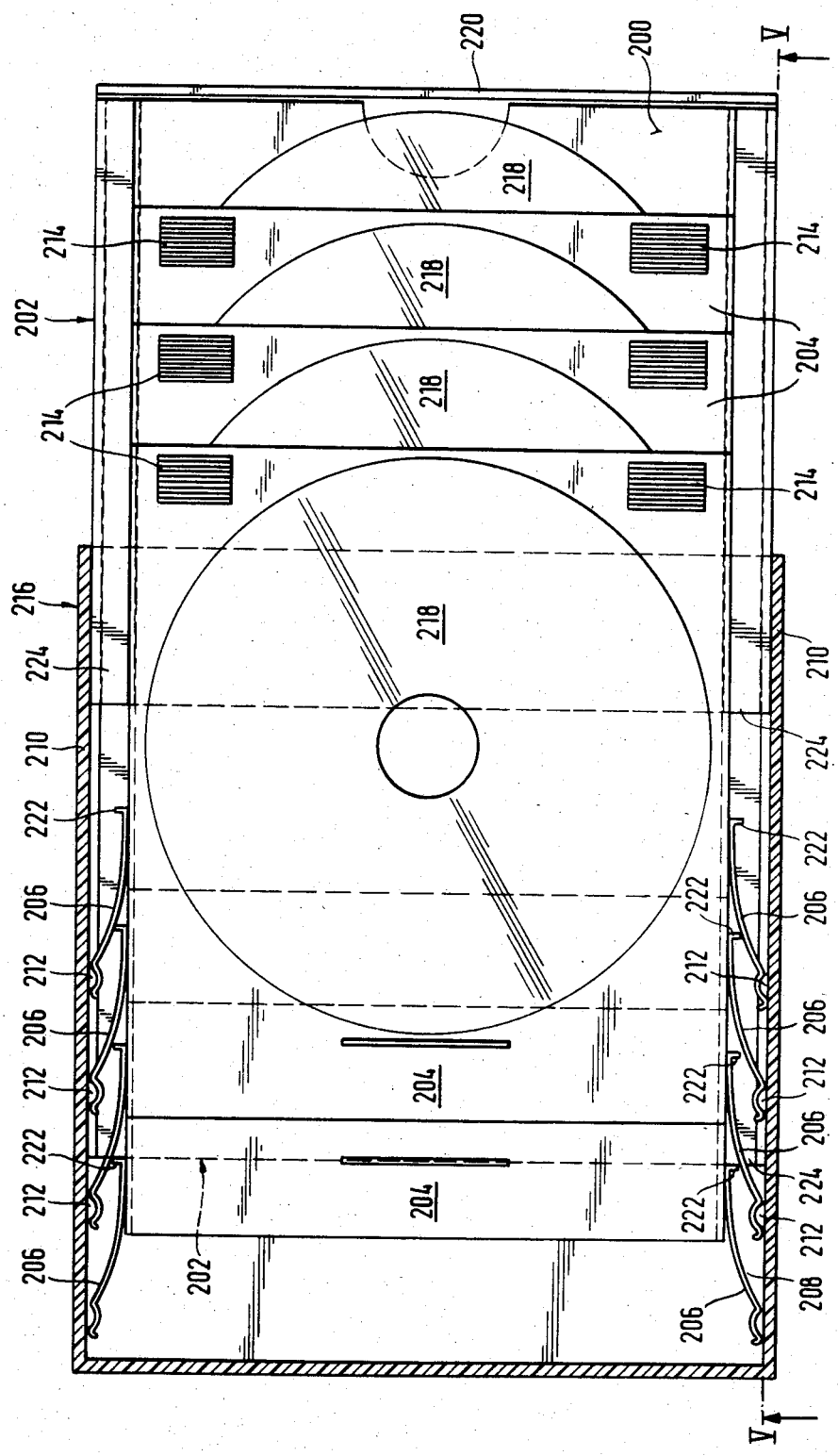

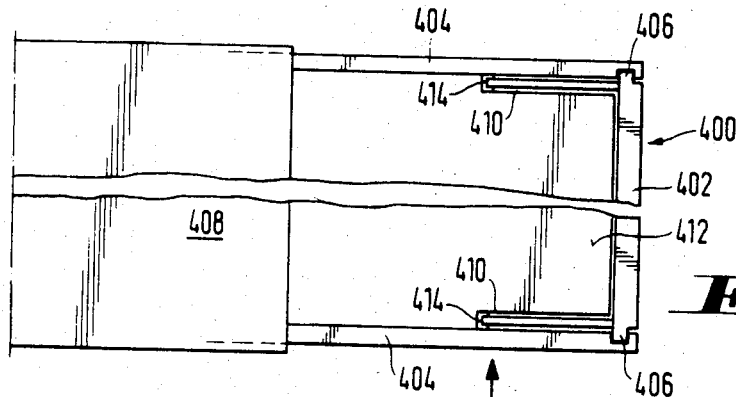
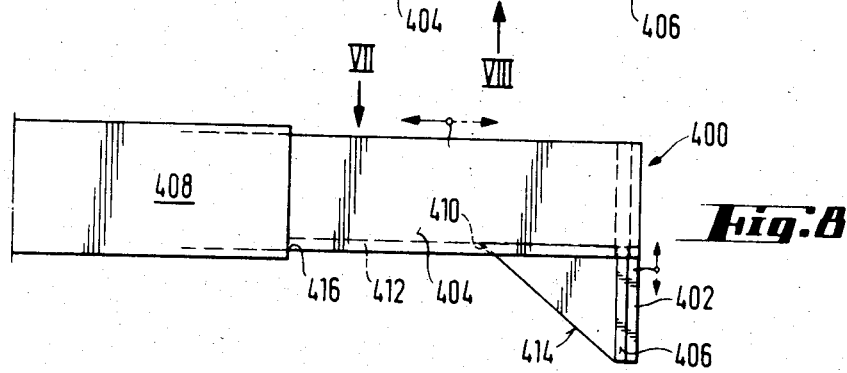
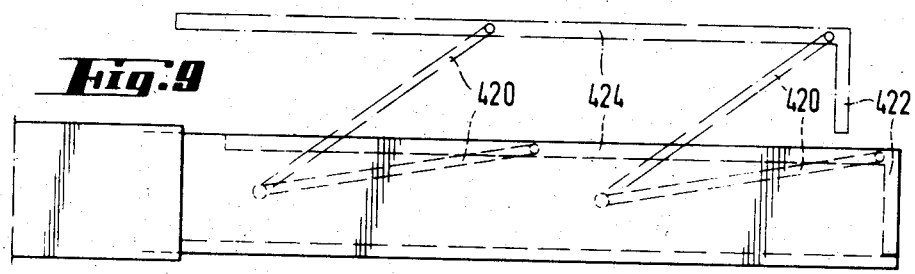
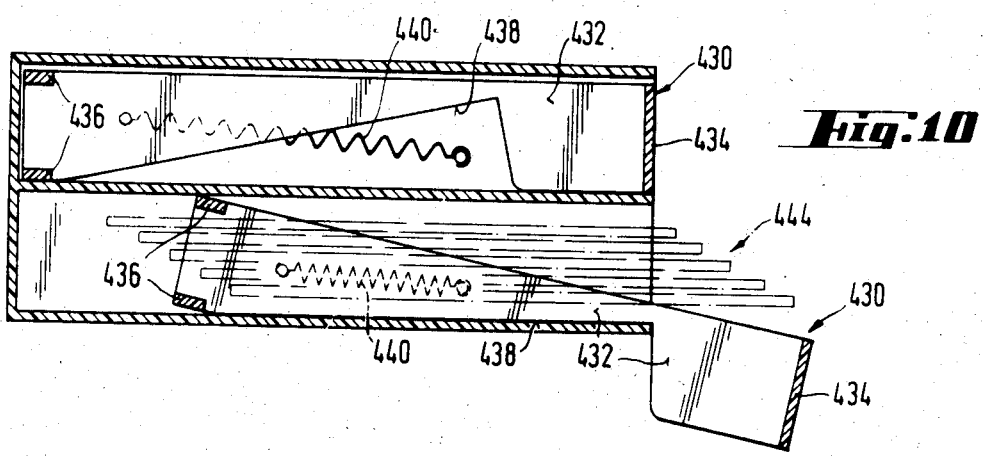

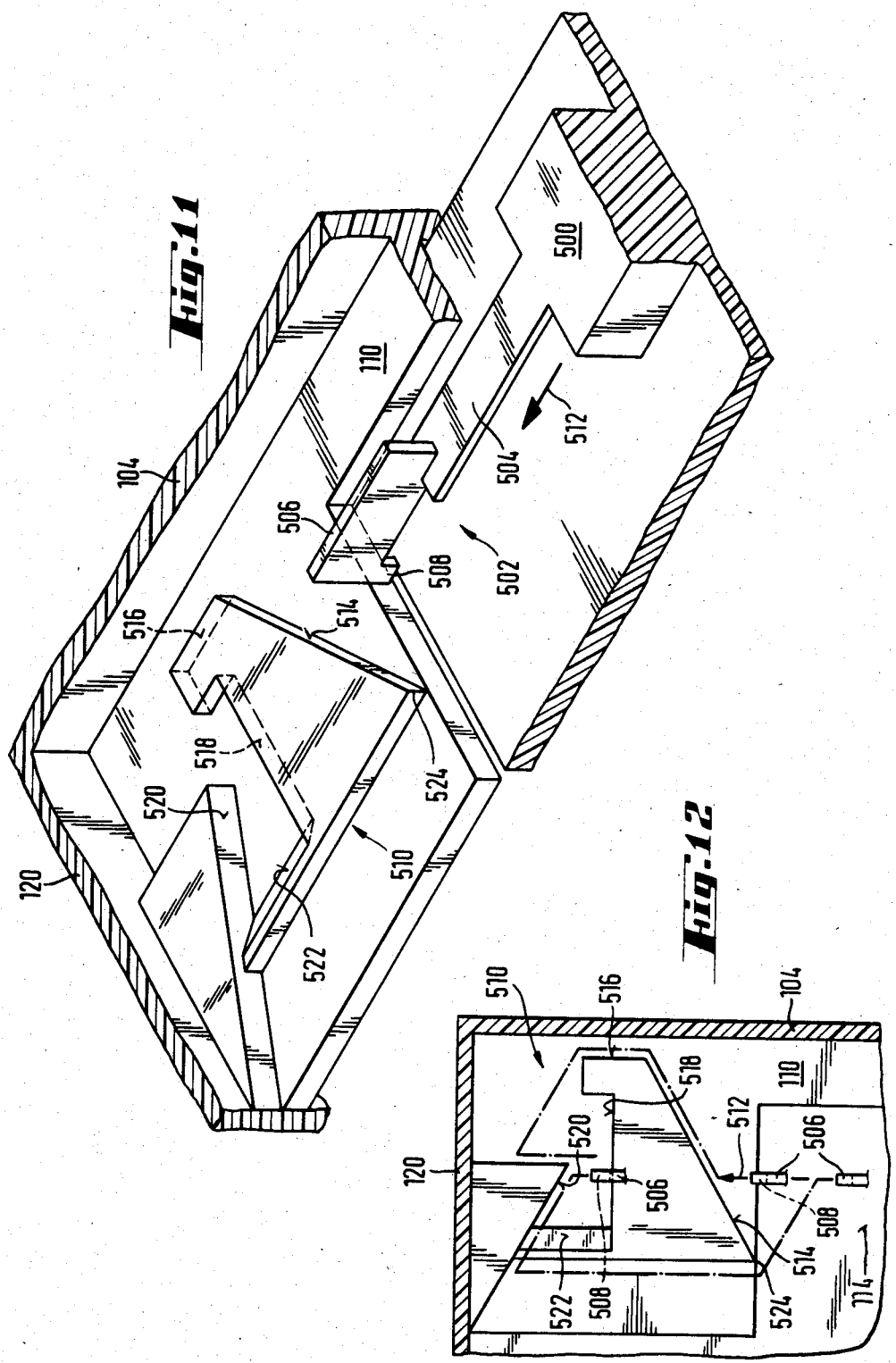

DEVICE FOR STORING GRAMOPHONE AND VIDEO DISCS

BACKGROUND OF THE INVENTION (1) Field of the Invention

The present invention relates to a filing system for disc-type recording media and particularly to such systems wherein the record discs, when moved from a storage position to an ejected position for user selection, are presented in a staggered relationship. More specifically, this invention is directed to the storage of gramophone and/or video discs and especially to a storage and retrieval technique wherein all of a plurality of stored discs are simultaneously presented for user selection and the discs may be returned to safe storage with minimal user attention. Accordingly, the general objects of the present invention are to provide novel and improved apparatus and methods of such character.

(2) Description of the Prior Art

Methods and apparatus for the storage of a "stack" of flat recording media, standard records for example, are well known in the art. Examples of such prior art apparatus and methods may be seen from British Pat. No. 794,216 and U.S. Pat. Nos. 2,760,839 and 2,720,438.

In the case of storage devices of the type shown in British Pat. No. 794,216, individual record holders are supported in a vertical stack in a box-like housing. A manually operable tension plate is provided beneath the lowest of the holders and this tension plate is connected to the adjacent holder by means of an arrangement of control cables. Each individual holder is coupled to the holder next above it in the vertical arrangement by a similar cable control. Movement of the tension plate will thus be coupled from holder to holder and when the tension plate is withdrawn from the housing the holders will all follow.

The apparatus of U.S. Pat. No. 2,760,839 operates on a principal similar to that of the above-discussed British patent. Thus, in the device of this U.S. patent all of the record holders are coupled by means of a common rod which serves as an ejection control. Manual withdrawal of the rod from a housing will thus result in the ejection of all of the holders with the amount of travel of the individual holders being varied so that a staggered arrangement is provided when the holders are in the ejected position.

In the apparatus of U.S. Pat. No. 2,720,438 the ejection movement is transferred, by means of a lever rod system, to the paper envelopes in which the record discs are kept when in storage.

Playback systems which are suitable for installation in motor vehicles and which accept so-called "compact discs", i.e., record discs which are read optically, have recently become available. There is, accordingly, a concommittant need for a disc-filing or storage system and technique that satisfys the comparatively harsh use conditions presented by the motor vehicle environment. In order to satisfy the usage requirements, a filing or storage system for a motor vehicle must, in addition to providing the requisite protection against damage resulting from mechanical vibration, be capable of operation with minimal attention. That is, the storage system must be characterized by ease of use and particularly by the ability to return a disc to storage without diverting attention from the task of vehicle control. A storage system for use in a motor vehicle should also, since space requirements dictate the manner of installation, be capable of operation in various angular orientations.

Prior art storage systems of the type shown in the three above-discussed publications do not meet present requirements. For example, the apparatus of British Pat. No. 794,216 does not have the ability, in the motor vehicle environment, of conveying the stored discs in a vertically upward direction since motion in the vertical direction would require the user the hold the tension plate with one hand while exchanging a disc with the other hand. This deficiency is also shared by the device of U.S. Pat. No. 2,760,839. While this problem is somewhat alleviated by the articulated lever-type rod system of U.S. Pat. No. 2,720,438, use of this patented system would nevertheless require the user to perform relatively complicated movements, which would require visual observation, and in some orientations, for example if the housing was installed in a horizontal position, the discs would not be readily accessible.

SUMMARY OF THE INVENTION

The present invention overcomes the above-briefly discussed and other deficiencies and disadvantages of the prior art by providing a storage/filing arrangement for disc-type recording media which is capable of functioning satisfactorily regardless of its angular orientation. The present invention also encompasses a technique for temporarily storing plural record discs wherein all of the stored discs will simultaneously be presented for selection, in a staggered relationship, upon command, and wherein a selected disc may be returned to storage with minimal attention on the part of the user.

Apparatus in accordance with the present invention includes a housing in which a plurality of individual record disc holders are slidably mounted. The holders are spring biased in the direction of ejection from the housing and, upon release of a locking mechanism, all of the holders will be moved to a position wherein they are partly extended from the housing. The degree of extension from the housing will be different for each holder and will be fixed either by cooperation between adjacent holders or by cooperation between the holders and the inside of the housing. Apparatus in accordance with the present invention also includes at least one transport member to which the force produced by the spring biasing means is transmitted, this transport member being coupled to or serving as part of one of the disc holders.

In accordance with the preferred embodiment the latching system may be unlocked, in order to prevent movement of the transport member, by touch actuation.

In accordance with one embodiment of the present invention the open side of the housing, through which the disc holders are extended, is covered with the holders in the inserted or storage position. The cover may be pivotally attached to the transport member so as to move therewith.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a schematic side elevation view, partly in section, of apparatus in accordance with a first embodiment of the present invention;

FIG. 2 is a front elevation view, also partly in cross-section, of the apparatus of FIG. 1;

FIG. 3 is a top plan view of the apparatus of FIGS. 1 and 2 with one array of disc holders being shown in the ejected position;

FIGS. 4a and 4b are partial side elevation views which depict alternate arrangements for a front closure panel for apparatus in accordance with the present invention;

FIG. 5 is a view similar to FIG. 1 which schematically illustrates apparatus in accordance with a second embodiment of the present invention, FIG. 5 being a view taken along line V—V of FIG. 6.

FIG. 6 is a schematic view taken along line VI—VI of FIG. 5;

FIGS. 7-10 are schematic views depicting further alternative arrangements for the front closure member of apparatus in accordance with the present invention; and FIGS. 11 and 12 respectively a partial perspective view and a schematic top plan view which show a latching mechanism suitable for use in the present invention.

DESCRIPTION OF THE DISCLOSED EMBODIMENTS

Referring to the drawing, and particularly simultaneously to FIGS. 1-3, a storage magazine for disc-type recording media in accordance with the present invention comprises a housing which has been indicated generally at 100. Housing 100 receives and supports a pair of transport slider systems which have been indicated generally at 102, the transport sliders being positioned one above the other as the storage system is depicted in FIGS. 1-3. The housing 100, on exterior of the side thereof which faces upwardly as the apparatus is shown in the drawing, is provided with undercut locking ridges or rails. Housing 100 is also provided, on the exterior of the side opposite to that which has the integral locking rails, with locking grooves which are complementary in shape to the locking rails. Accordingly, a plurality of the housings 100 can be locked together, in a modular construction, to provide a large capacity record disc storage system.

Housing 100 is provided, extending inwardly from the oppositely disposed sides thereof, with integral oppositely disposed pairs of guide rails 106, 108 and 110, 112. The cooperating guide rails of each pair define a channel which receives a flange extending outwardly from the frame of slider system 102, the slider systems thus being guided for movement in these channels between the ejected position, as shown for the upper slider system in FIG. 1, and the inserted or storage position. It is to be noted that, in the embodiment of FIGS. 1-3, the lower slider 102 does not rest directly on the floor 114 of the housing but rather is supported by ridge-like protrusions 116 which are in registration with the locking grooves in the outside of housing 100.

Each of the sliders 102 includes a pair of ejection springs 118. Springs 118 are helical compression springs which extend from rear wall 120 of housing 100 to projections 122 which are integral with and extend outwardly from the side walls or struts 124 of the sliders. The struts 124 of the sliders are spaced from and oriented parallelly with respect to the side walls 104 of housing 100. Support rods 126 are provided to prevent the springs 118 from buckling, the support rods extending from housing rear wall 120 and passing through the projections 122.

The struts 124 of each slider are interconnected by a base plate 128. Struts 124 have, integrally formed therewith, parallel inwardly extending guide rails 130. The guide rails 130 are received in guide grooves 134 which are integral with, in the embodiment being described, the side edges of three separate disc holders which have been indicated generally at 132. Each of the disc holders 132 is provided, on its underside, with a projection or claw 136. These projections 136, as may be seen from FIG. 1, are displaced by varying distances from the rear sides, i.e., the most inwardly disposed end edges 138, of the disc holders. The projections 136 determine the "strokes" of the holders 132, each holder having a different stroke with the strokes decreasing in length in a direction which is away from the base plate 128 of the associated slider.

Each of the disc holders 132 is also provided, adjacent its inner end 138, with a drive projection 140 which extends in the opposite direction with respect to the projections 136. In the case of the uppermost of holders 132, a motion limiting projection 136' is integrally formed on the underside of the top wall 142 of housing 100. In the case of the lowermost disc holder 132, a drive projection 140' is integrally formed on the slider base plate 128. The projections 136 and the drive projections 140 may, but do not necessarily, extend across the entire width of the holders 132. In the embodiment being described the lowermost of holders 132 performs the dual function of transport member and disc holder.

The sliders 102, at their front ends, i.e., the ends disposed oppositely with respect to inner ends 138, are provided with a front panel or closure plate 144. In the embodiment of FIGS. 1-3 the front panel 144 is articulated to the slider. Thus, a pair of oppositely disposed cheeks or arms 146 extend from front panel 144 to a pivot or hinge 148. A torsion spring may be installed on hinge 148 to cause the panel 144 to pivot downwardly, as shown for the upper one of sliders 102 in FIG. 1, after the slider has been unlocked and moved to the ejected position. When the slider 102 is inserted in housing 100 and latched, the front panel 144 covers the housing opening.

As may be seen from FIG. 2, the disc holders 132 have a shallow double dished profile. Accordingly, during insertion and removal, and also during storage, only the edge portions of the disc will be contacted by the holder. For a further description of the shape and construction of the holders, reference may be had to contemporaneously filed application Ser. No. 645,061 entitled "CONTAINER FOR FLAT RECORDING MEDIA", and particularly to the description of FIGS. 1-3 thereof.

The locking mechanisms which hold the sliders 102 in the storage or inserted position against the bias of springs 118 is, in part, indicated generally at 502 in FIG. 1 and will be described below in the discussion of FIGS. 11 and 12.

When unlocked, a slider 102 will be pushed outwardly through the open front side of housing 100 by its associated pair of springs 118. During such movement the slider will be guided by cooperation between the pairs of guide rails, integral with housing 100 and the flanges which extend outwardly from the base of struts 124 at the level of the base plate 128. Because of cooperation between a driver 140' which extends upwardly from slider base plate 128 and the projection 136 on the lowermost of holders 132, movement of the slider will be imparted to the lower holder. In like fashion, movement of the lower holder will be imparted to the adjacent holder and this action will continue until all of holders 132 have reached the position shown for the upper slider in FIG. 1. Movement of the individual holders positioned above the lowermost holder from the storage position to the ejected position will be delayed by a period of time commensurate with the vertical offsets of the projections 136, i.e., the lowermost holder will move first, then proceeding upwardly therefrom movement will be imparted to each holder by the adjacent holder, on the side of the slider base plate, in a staggered sequence. Movement of the holders will terminate when the driver member 140 on the uppermost holder contacts the projection 136' on the inside of housing 100. Upon reinsertion the holders are serially engaged by the front panel 144 and the insertion operation continues until the slider 102 has returned to the locked position in housing 100.

As indicated in FIGS. 1 and 2, the design of a storage system in accordance with the present invention may provide sufficient space in each holder, above a stored record disc, to accommodate the booklet 150 which usually is provided with a compact disc when it is purchased.

Referring now to FIGS. 5 and 6, a principal difference between the embodiment disclosed therein and the embodiment of FIGS. 1-3 resides in the fact that motion of the disc holders, indicated generally at 204, in the ejection direction is not limited by mechanical stops as in the embodiment of FIGS. 1-3 where the projections 136 and 140 cooperate. To the contrary, in the embodiment of FIGS. 5 and 6 a friction-type control is employed which, when movement is produced by the influence of the ejection spring, causes the discs to stop in a staggered relationship. However in the embodiment of FIGS. 5 and 6 the discs may be individually and manually withdrawn further from the housing, indicated generally at 216.

To further describe the embodiment of FIGS. 5 and 6, the lowermost of holders 204 of each array comprises the base or floor member 200 of an associated slider, the sliders being indicated generally at 202. Leaf springs 206 are carried by the holders 204 and extend outwardly therefrom into the space 208 which extends between holders 204 and the inside of the housing 216. The leaf springs 206 are shaped at their trailing ends so as to cooperate with cam-like projections 212 integrally formed on the inside of the housing side walls 210. The positions of the cams 212 which are associated with the different holders are staggered so as to define, in the manner to be described below, the ejected positions shown in FIG. 6 which are assumed by the various holders.

Upon unlocking thereof, motion will be imparted to a slider 202 by the ejection springs and, as a result of the frictional coupling therebetween, all of the sliders will move in the ejection direction. During such movement the springs 206 will slide along the side walls 210 of housing 216 until the shaped end portions thereof, which are complementary to the cams 212, ride over a cam. At this point the braking force resulting from cooperation between the springs and cams is sufficient to arrest the continued forward movement of the holders 204. Accordingly, because of the staggering of the positions of cams 212, the holders will stop with a staggered orientation. Each of holders 204 is provided, on its upper side and in an area displaced from that occupied by the record disc 218, with a knurled surface area 214. As represented in FIG. 5, there will be sufficient friction between the surface areas 214 and the fingertip of a user to overcome the locking cooperation between the leaf springs 206 and cams 212 and thus a selected holder may be withdrawn to the full limit of motion of the slider 202. Accordingly, the embodiment of FIGS. 5 and 6 offers added access to the stored discs 218. Upon reinsertion, all of the holders 204 will be contacted and driven back into housing 216 by the front panel 220 and the springs will deflect and snap over the cams 212. It is to be noted that each of springs 206, at the end opposite to that which cooperates with the cams 212, is provided with an outwardly extending projection 222. The projections 222 define the position of maximum withdrawal of the holders from housing 216 by contacting the ends of the struts or side plates 224 which comprise part of each slider 202.

A cut-out will typically be provided adjacent the front edge of the lowermost of holders 204 of each array. This cut-out permits access to the upper and lower faces of the compact disc 218 which is carried by the lower holder. Such cut-outs may, of course, be provided on all of the holders 204 and, if provided, it is preferable to also provide sufficient clearance between adjacent holders to permit the edge of a record disc to be grasped.

Rather than hinge the slider front panel to the side struts thereof as shown in the case of the embodiments of FIGS. 1-3 and FIGS. 5 and 6, the front panel of the slider may be constructed to fold about an axis. Thus, referring to FIGS. 4a and 4b, the base plate of a slider has been indicated at 300. In the arrangement of FIG. 4a the front wall 302, together with a leading edge portion of the base 300, pivots about a hinge which has its axis lying in the plane of the slider base. In the embodiment of FIG. 4b the front wall 304 is hinged to base 300 at the front edge thereof.

FIG. 7-10 show various alternatives of a front closure plate for the housing of a storage system of the type described above. Thus, in the embodiment of FIGS. 7 and 8, the slider 400 has a front wall or panel 402 which is capable of sliding downwardly in a direction transverse to the plane of the slider base. Front wall 402 is guided in the slider side walls or struts 404 by means of its outwardly extending flanges or ribs 406, the ribs 406 being engaged in complementary shaped guide grooves in side walls 404. Wedge-shaped arms extend rearwardly from front wall 402 and are received in slots 410 of the base 412 of the slider 400. During insertion the angled edge 414 of the wedge-shaped arms will contact the lower leading edge 416 of housing 408 thereby causing the front wall 402 to move upwardly to the closed position.

FIG. 9 represents an embodiment in which the front wall 422 is connected to the slider by means of a pair of arms 420 which cooperate to define a parallelogram-type linkage. In the FIG. 9 embodiment the front plate 422 is integral with a cover plate 424.

In the embodiment depicted in FIG. 10 the slider 430 is substantially frame-shaped and includes a pair of oppositely disposed side bars 432 which are joined to one another at one end by front panel 434 and at the other end by a pair of cross members 436. The side bars 432 of the slider are provided with triangular shaped cut-outs 438. The provision of the cut-outs 438 enables the slider, when transported out of the housing under the influence of the ejection springs 440, to pivot downwardly as shown in the case of the lower slider. The pivoting action of the slider in the FIG. 10 embodiment results from the action of laterally acting tension springs, not shown. In FIG. 10 five disc holders are schematically and generally indicated at 444.

Referring now to FIGS. 11 and 12, a locking mechanism which is suitable for use with any of the embodiments of the present invention is shown. In the arrangement of FIGS. 11 and 12 the slider base plate is indicated generally at 500 and has formed integrally therewith a spring member which has been indicated generally at 502. The spring member 502 is comprised of a first leaf spring 504, configured to move toward and away from the plane of the slider base, and a second leaf spring 506, which is configured to move transversely with respect to the direction of motion of spring 504. The leading end of spring 502, in the insertion direction, is provided with a downwardly extending tab 508. A clearance is provided, for purposes which will become obvious from the discussion below, between the springs 504 and 506 and the tab 508 and the base plate 500.

The housing, which includes side wall 104, rear wall 120 and a guide rail 110, is provided with a platform which includes, integrally moulded therewith, a cam arrangement which has been indicated generally at 510. During insertion the base plate of the slider will partly pass under the cam arrangement supporting platform while the spring member 502 will pass above the platform and cooperate with the control cams thereon.

On insertion of the slider in the direction of arrow 512, the tab 508 will contact a first control face 514 of the cam arrangement and thus spring 506 will be deflected to the right as the apparatus is depicted in the drawing. As the insertion motion continues, the tab 508 will reach and then slide along edge 516 of the control cam. Upon reaching the rearwardly disposed end of edge 516, the spring 506 will snap back to its initial position. The user at this time releases the front panel of the slider and the ejection spring arrangement will cause the slider to move forwardly a slight distance until a locked condition is established by cooperation between tab 508 and a locking edge 518 on the control cam. When the slider is pressed inwardly again, the tab 508 will contact a control face 520 and spring 506 will thus be deflected to the left. During this deflection to the left the tab 508 will contact an upwardly angled cam surface 522 and thus spring 504 will simultaneously be deflected upwardly. Continued movement will result in tab 508 "falling" off of the control cam whereupon spring 504 will return to its initial condition. If the pressure on the front panel of the slider is released at this time, the unlocked slider will be ejected by the action of the ejection springs. During movement in the ejection direction, when the tab 508 passes the forward edge 524 of the control cam, the spring 506 will return to its initial position. It is particularly to be noted that in both the locked and unlocked position neither of springs 504 or 506 will be in tension. This permits plastic materials, which have a tendency to cold flow, to be used for all of the parts of the locking mechanism.

While preferred embodiments have been shown and described, various modifications and substitutions may be made thereto without departing from the spring and scope of the invention. Accordingly, the present invention has been described by way of illustration and not limitation.

What is claimed is:

1. Apparatus for use in the storage of disc-shaped record media comprising:

housing means, said housing means being open on only one side, said open side defining a generally planar housing front;

a plurality of holder means, said holder means receiving and storing disc-shaped record media, said holder means each having a generally rectangular shape with side edges and being slidably mounted in said housing means in a stacked relationship;

transport slider means, said transport slider means being positioned in said housing means for reciprocal movement through said housing means open side between an inserted position and an ejected position, said reciprocal movement being in a direction which is generally transverse to said housing front, said transport slider means including:

a base defining member;

cover defining means movably coupled to said base defining member, said cover defining means comprising a front wall which extends transversely with respect to the direction of movement of said transport slider means when said transport slider means is in the inserted position to cover said housing means open side; and means for supporting said cover defining means, said supporting means enabling simultaneous movement of said cover defining means with said base defining member and relative to said base defining member, said relative movement including at least a directional component which is at an angle with respect to the direction of movement of said base defining member, said relative movement of said cover defining means during movement of said transport slider means form the inserted to the ejected position providing simultaneous access to said plurality of said holder means when said slider means is in the ejected position;

means coupling said transport slider means to at least a first of said holder means whereby movement of said slider means will be imparted to said first holder means;

means establishing a driving connection between said first of said holder means and the remainder of said holder means, said driving connection establishing means including means mechanically interconnecting said holder means, said interconnecting means engaging each of said holder means at a point which is offset from a first side edge thereof by a different distance than the point of engagement with the other of said holder means;

fixed stop means on the interior of said housing means for defining the limit of travel in the ejection direction and thus the ejected position of at least one of said holder means whereby said driving connection establishing means will define different normal lengths of travel of each of said holder means;

means for resiliently biasing said transport slider means toward the ejected position; and means for releasably locking said transport slider means in said inserted position in said housing means against the bias of said resilient biasing means.

2. The apparatus of claim 1 further comprising:

means for moving said cover defining means relative to said base defining member of said transport slider means.

3. The apparatus of claim 1 wherein said cover defining means is supported for sliding motion in a direction transverse to the direction of motion of said transport slider means.

4. The apparatus of claim 1 wherein said cover defining means supporting means is hinged to said base defining member of said transport slider means.

5. The apparatus of claim 1 wherein said cover defining means supporting means comprises means for mounting said cover defining means from the inside of said housing means for pivotal movement about an axis.

6. The apparatus of claim 1 wherein each fo said holder means has at least a partly curved profile when viewed in cross-section whereby a disc positioned thereon is supported only at its recording track-free edge.

7. The apparatus of claim 6 wherein said holder means profile is at least in part dished.

8. The apparatus of claim 7 wherein at least some of said holder means have a pair of oppositely disposed faces which define a concave profile whereby a disc may be supported at its edge on one of said faces.

9. The apparatus of claim 1 wherein said transport slider means base defining member also receives and holds a disc-shaped record media.

10. The apparatus of claim 1 wherein said locking means locks automatically by insertion of the slider means from the ejected position and unlocks again when pressure is exerted in the insertion direction when said slider means is in the locked state.

11. The apparatus of claim 1 wherein at least one of said holder means is cut-out at its outermost end so to permit access to the upper and lower face of a segment of a disc-shaped record media.

12. The apparatus of claim 11 wherein adjacent of said holder means are spaced by a distance permitting finger access between them.

13. Apparatus for use in the storage of disc-shaped record media comprising:
housing means, said housing means having an open side;
a plurality of holder means, said holder means receiving and storing disc-shaped record media, said holder means being slidably mounted in said housing means in a stacked relationship;
transport slider means, said transport slider means being positioned in said housing means for movement through said housing means open side between an inserted position and an ejected position;
means coupling said transport slider means to at least a first of said holder means whereby movement of said slider means will be imparted to said holder means;
fixed stop means for limiting the motion of said transport slider means in the ejection direction;
means for defining a different normal length of travel for each of said holder means, said normal travel length defining means causing said holder means to lie stepped relative to one another in the ejected position, said normal travel length defining means frictionally engaging said housing means whereby said holder means may be moved in the ejection direction beyond said normal lengths of travel by overcoming said frictional engagement;
means for resiliently biasing said transport slider means toward the ejected position; and
means for releasably locking said transport slider means in said housing means against the bias of said resilient biasing means.

14. The apparatus of claim 13 further comprising:
means for covering said housing means open side when said transport slider means is in the inserted position, said covering means being supported for movement with said transport slider means and also being movable relative to said transport slider means, said relative movement including a directional component which is angularly oriented with respect to the direction of movement to said transport slider means.

15. The apparatus of claim 14 wherein said covering means comprises the front wall of said transport slider means.

16. The apparatus of claim 15 wherein said holder means each have at least a first surface which is at least partly concave whereby a disc positioned on the holder means will be supported only at its recording track-free edge.

17. The apparatus of claim 16 wherein said locking means locks automatically by insertion of the slider means from the ejected position and unlocks when pressure is exerted in the insertion direction when said slider means is in the locked state.

18. The apparatus of claim 13 wherein said housing means defines at least two cavities which are open at said one side, said cavity openings being substantially coplanar, a plurality of holder means being slidably mounted in each of the said cavities, and one of said transport slider means being positioned in each of said cavities.

19. The apparatus of claim 1 wherein said housing means defines at least two cavities which are open at said one side, said cavity openings being substantially coplanar, a plurality of holder means being slidably mounted in each of the said cavities, and one of said transport slider means being positioned in each of said cavities.

20. The apparatus of claim 1 wherein said housing means defines a first cavity and at least a second cavity, said holder means and said transport slider means being disposed in said first cavity, said means for resiliently biasing said transport slider means being located within said second cavity, said first and second cavities being separated by a partition wall.

* * * * *